US008357919B2

(12) United States Patent
Bushmaker (10) Patent No.: US 8,357,919 B2
(45) Date of Patent: Jan. 22, 2013

(54) SYSTEMS, METHODS, AND APPARATUS FOR GENERATING TERAHERTZ ELECTROMAGNETIC RADIATION

(75) Inventor: Adam Wayne Bushmaker, El Segundo, CA (US)

(73) Assignee: The Aerospace Corporation, El Segundo, CA (US)

( * ) Notice: Subject to any disclaimer, the term of this patent is extended or adjusted under 35 U.S.C. 154(b) by 99 days.

(21) Appl. No.: 13/115,598

(22) Filed: May 25, 2011

(65) Prior Publication Data

US 2012/0298889 A1 Nov. 29, 2012

(51) Int. Cl.
*G02F 1/35* (2006.01)
*G02F 2/02* (2006.01)

(52) U.S. Cl. ............... 250/493.1; 372/4; 372/6; 372/12; 372/20; 372/21

(58) Field of Classification Search ............... 250/251, 250/493.1; 372/4, 6, 12, 20
See application file for complete search history.

(56) References Cited

U.S. PATENT DOCUMENTS

| | | | | |
|---|---|---|---|---|
| 6,310,899 | B1* | 10/2001 | Jacobovitz-Veselka et al. | 372/6 |
| 7,054,339 | B1* | 5/2006 | Hu et al. | 372/12 |
| 7,113,534 | B2* | 9/2006 | Unterrainer et al. | 372/99 |
| 7,486,250 | B2* | 2/2009 | Vetrovec et al. | 343/820 |
| 7,507,979 | B2* | 3/2009 | Vetrovec et al. | 250/493.1 |
| 7,656,911 | B2* | 2/2010 | Mizutani et al. | 372/20 |
| 7,710,637 | B2* | 5/2010 | Ikari et al. | 359/330 |
| 2008/0025349 | A1* | 1/2008 | Mizutani et al. | 372/20 |
| 2010/0195675 | A1* | 8/2010 | Moloney et al. | 372/4 |
| 2011/0103801 | A1* | 5/2011 | Breunig et al. | 398/118 |

OTHER PUBLICATIONS

Savchenkov, A. A., "Parametric Oscillations in a whispering gallery resonator." Optics Letters; vol. 32 No. 2; Pasadenda, CA. Jan. 15, 2007.
Kippenberg, T.J., et al. "Cavity Opto-Mechanics." Optics Express, vol. 15, No. 25; Pasadena, California. Dec. 2007. (34 pgs.).
Byer, R.L., et al. "Visible CW Parametric Oscillator." Applied Physics Letters, vol. 13, No. 3; Stanford, California. Aug. 1968. (3 pgs.).
Rokhsari, H., et al. "Radiation-pressure-driven micro-mechanical oscillator." Optics Express, vol. 13, No. 14; Pasadena, California. Jun. 2005. (9 pgs.).
Braginsky, V.B., et al. "Parametric oscillatory instability in Fabry-Perot interferometer." Physics Letters A, pp. 331-338; Moscow, Russia. Jul. 2001. (8 pgs.).
Rokhsari, H., et al. "Theoretical and Experimental Study of Radiation Pressure-Induced Mechanical Oscillations (Parametric Instability) in Optical Microcavities." IEEE Journal of Selected Topics in Quantim Electronics, vol. 12, No. 1; Pasadena, California. Jan. 2006. (12 pgs.).

(Continued)

*Primary Examiner* — David A Vanore
(74) *Attorney, Agent, or Firm* — Sutherland Asbill & Brennan LLP (57) ABSTRACT

Certain embodiments of the invention may include systems, methods, and apparatus for generating terahertz electromagnetic radiation. According to an example embodiment of the invention, a method is provided for generating terahertz electromagnetic radiation. The method includes: coupling a terahertz resonator with an optical resonator, wherein the optical resonator comprises non-linear optical material; directing laser light through the optical resonator to generate terahertz radiation by parametric interaction of the laser light with the optical resonator and the terahertz resonator; and directing the terahertz radiation from the terahertz resonator to an output.

20 Claims, 5 Drawing Sheets

OTHER PUBLICATIONS

Hossein-Zadeh, M., et al. "Characterization of a radiation-pressure-driven micromechanical oscillator." Physical Review A; Pasadena, California. Aug. 2006. (15 pgs.).

Ding, Yujie, et al. "Efficient THz generation and frequency upconversion in GaP crystals." Solid State Electronics, pp. 1128-1136; Bethlehem, Pennsylvania. Jun. 2006. (9 pgs.).

Kawase, Kodo, et al. "Coherent tunable THz-wave generation from LiNbO3 with monolithic grating coupler." Applied Physics Letters, vol. 68, No. 18; Sendai, Japan. Mar. 1996. (3 pgs.).

Bo, Sun, et al. "Investigation of pump-wavelength dependence of terahertz-wave parametric oscillator based on LiNbO3." Chinese Physics B, vol. 18, No. 7; Wuhan, China. Jul. 2009. (7 pgs.).

Walther, Christoph, et al. "Microcavity Laser Oscillating in a Circuit-Based Resonator." Science Magazine, vol. 327; Washington, D.C. Mar. 2010. (3 pgs.).

Haus, J.W., et al. "Enhanced Tunable Terahertz Generation in Photonic Band-Gap Structures." Laser Physics, vol. 14, No. 5; Dayton, Ohio. 2004. (8 pgs.).

Chen, Yuchuan, et al. "Investigation of Millimeter Wave Parametric Generation from a THz Photonic Band Gap Device." IEEEAC paper #1001, Version 5. Sep. 2005. (8 pgs.).

\* cited by examiner

SYSTEMS, METHODS, AND APPARATUS FOR GENERATING TERAHERTZ ELECTROMAGNETIC RADIATION

FIELD OF THE INVENTION

This invention generally relates to high-frequency electronics sources, and in particular, to generating terahertz electromagnetic radiation.

BACKGROUND OF THE INVENTION

Terahertz (THz) technology is a newly emerging field that has numerous applications in the medical imaging, defense, security, communications, and manufacturing industries. THz radiation refers to electromagnetic waves propagating at frequencies in the terahertz range, and is sometimes referred to as sub-millimeter radiation, terahertz waves, terahertz light, T-rays, T-light, or T-lux. THz typically applies to electromagnetic radiation with frequencies between the high-frequency edge of the microwave band near 300 GHz and the long-wavelength edge of far-infrared light near 3000 GHz. Wavelengths in this spectrum range from about 100 μm (infrared) to 1.0 mm (microwave).

THz waves usually travel in line of sight, and are capable of penetrating a wide variety of non-conducting materials. For example, THz radiation can pass through clothing, paper, cardboard, wood, masonry, plastic and ceramics. It can also penetrate fog and clouds, but cannot penetrate metal or water.

Parametrically generated oscillations have been produced via parametric instability between two coupled oscillators, and has been theoretically studied and experimentally observed in opto-mechanical systems, with parametric coupling achieved through radiation pressure. In these studies, researchers were able to create sustained oscillations at radio frequencies in micro-mechanical resonators. Certain designs have produced continuous wave THz radiation by directing light from two lasers into a non-linear medium or photoconductive antenna. Despite the promising applications of this technology, the availability of compact, reliable sources of THz waves is still limited.

BRIEF SUMMARY OF THE INVENTION

Some or all of the above needs may be addressed by certain embodiments of the invention. Certain embodiments of the invention may include systems, methods, and apparatus for generating terahertz electromagnetic radiation.

According to an example embodiment of the invention, a method is provided for generating terahertz electromagnetic radiation. The method includes coupling a terahertz resonator with an optical resonator, wherein the optical resonator comprises non-linear optical material; directing laser light through the optical resonator to generate terahertz radiation by parametric interaction of the laser light with the optical resonator and the terahertz resonator; and directing the terahertz radiation from the terahertz resonator to an output.

According to another example embodiment, a system is provided for generating terahertz electromagnetic radiation. The system includes a laser for producing laser light with a center frequency ω; an optical resonator including a non-linear optical material and operable to receive the laser light and; a terahertz resonator coupled with the optical resonator through the non-linear optical material, wherein the terahertz resonator generates terahertz radiation by parametric interaction of the laser light with the optical resonator and the terahertz resonator.

According to another example embodiment, an apparatus is provided for generating terahertz electromagnetic radiation. The apparatus includes an optical resonator. The optical resonator includes a non-linear optical material and is operable to receive laser light. The apparatus also includes a terahertz resonator coupled with the optical resonator through the non-linear optical material, wherein the terahertz resonator is configured for generating terahertz radiation by parametric interaction of the laser light with the optical resonator and the terahertz resonator.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE DRAWINGS

Reference will now be made to the accompanying tables and drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable the generation of terahertz (THz) radiation. According to certain example embodiments, continuous wave (CW) or quasi-CW THz radiation may be generated using compact components. Example embodiments of the invention enable the generation of THz radiation via the use of certain components operating at room temperature. Various resonant cavities, a laser, and non-linear material may be utilized for producing THz radiation, according to example embodiments of the invention, and will now be described with reference to the accompanying figures.

Figure 1:
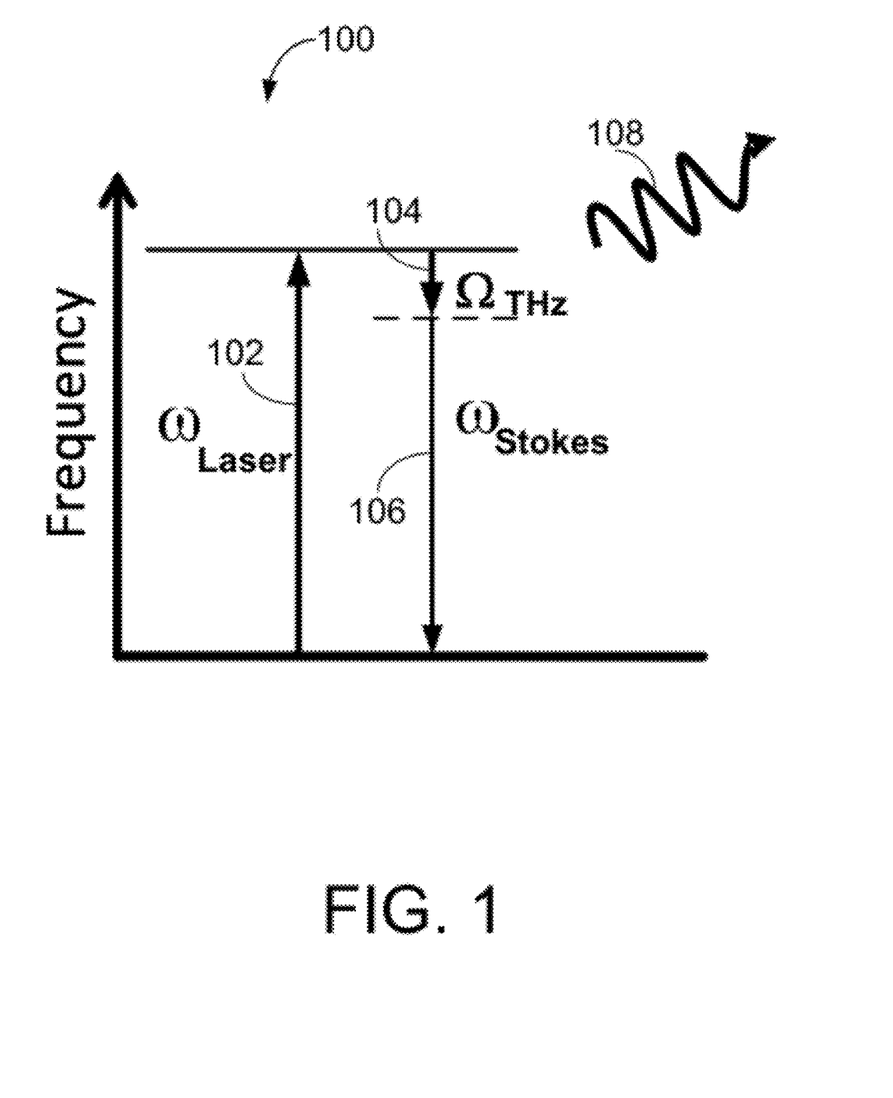
FIG. 1 is an example diagram showing the frequency relationship between the input laser light and the terahertz radiation, according to an example embodiment of the invention.

FIG. 1 is an example diagram 100 illustrating the frequency relationship between input laser light and THz radiation 108, according to an example embodiment of the invention. Example embodiments of the invention may utilize an optical cavity parametrically coupled to a THz electromagnetic resonator through a non-linear material. In an example embodiment, the non-linear material may be pumped with a CW laser having center frequency w that is detuned with respect to the resonant frequency of the optical cavity. In an example embodiment, the laser radiation, and in particular, the laser light electric field, may interact with the non-linear material causing the THz resonator to oscillate. This process can be viewed as down-conversion of an optical pump photon 102 through parametric excitation to a lower energy optical photon 106 and a THz photon 104. This is similar to Stokes Raman scattering, with the THz photon taking the place of the phonon.

Example embodiments of this invention could also serve as a gain medium for other electrical components in a THz integrated circuit, such as amplifiers, mixers, and switches. According to example embodiments of the invention, the laser may be tuned to the high-frequency side of the optical resonance in order to produce gain via the down-conversion process.

Figure 2:
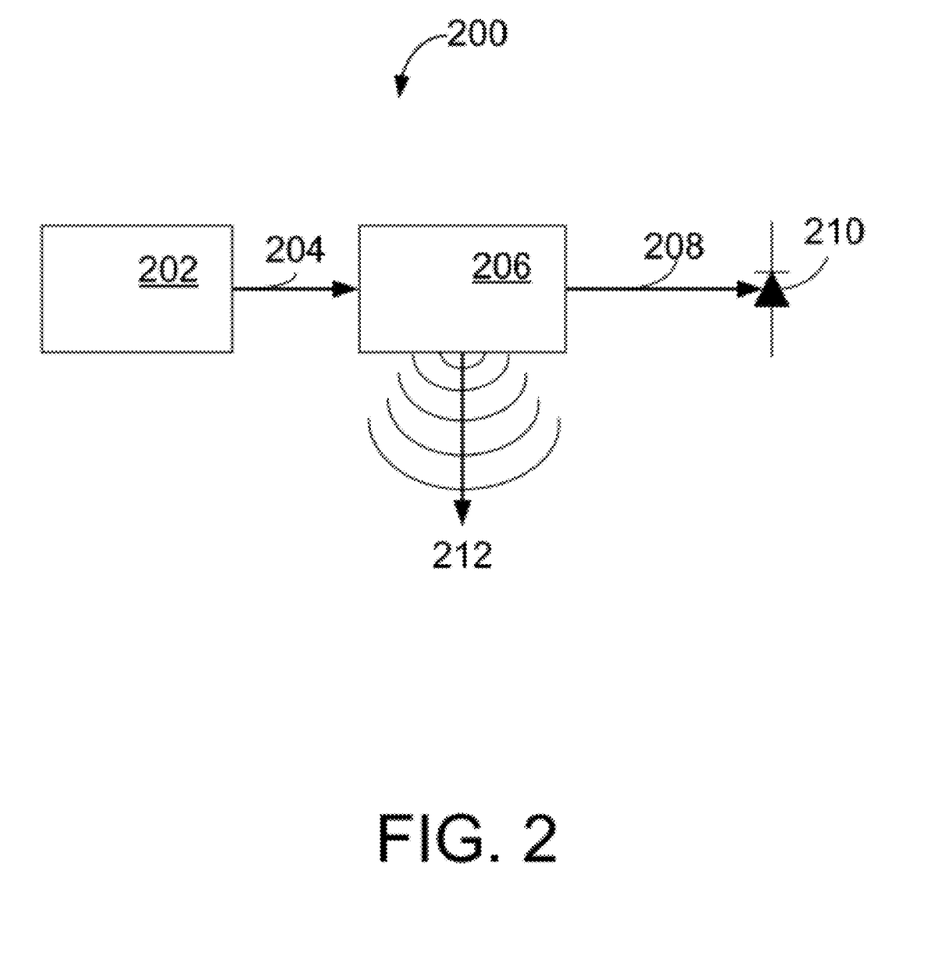
FIG. 2 is a block diagram of a terahertz wave generator according to an example embodiment of the invention.

FIG. 2 depicts an example block diagram of a THz wave generator 200, according to an example embodiment of the invention. The THz wave generator 200 includes a coupled optical resonator and a THz resonator 206. The optical resonator includes an optical cavity, which is capable of storing optical frequency electromagnetic energy from input light 204 produced by a laser 202 and input to the optical cavity. In an example embodiment, the THz resonator 206 includes a cavity, which is capable of storing THz frequency electromagnetic energy. According to example embodiments of the invention, the optical resonator and THz resonator are parametrically coupled, such that the fields in each of the cavities influence the state of the other cavity. According to an example embodiment, the laser 202 may be tuned to the high-frequency side of the optical resonance, such that down-converted photons are still in the resonance window of the optical cavity. According to an example embodiment, the optical power of the output light 208 may be detected by a detector 210. In an example embodiment, the optical power of the input light 204 may also be detected by an input light detector (not shown) and compared with the optical power of the output light 208 to provide a measure of the approximate power converted into THz radiation 212.

Figure 3:
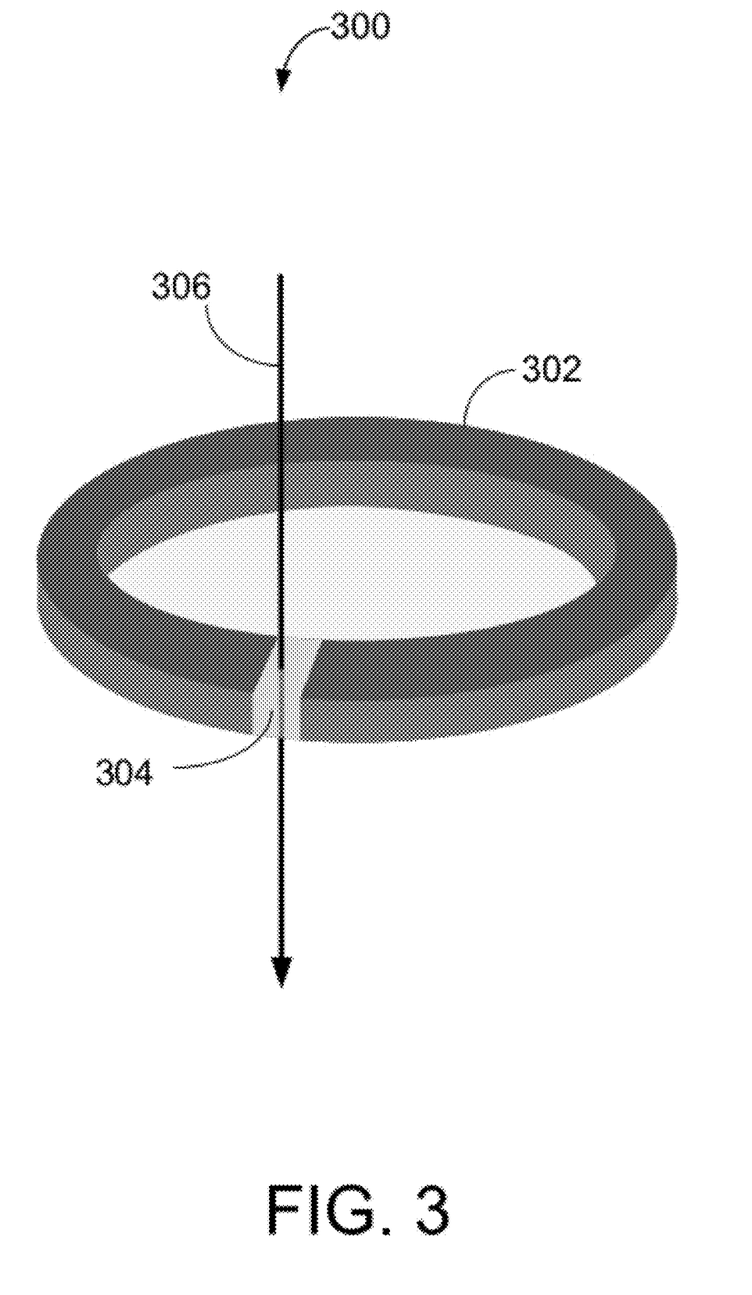
FIG. 3 is a diagram of a split-ring terahertz generator according to an example embodiment of the invention.

FIG. 3 depicts an example embodiment of a split-ring THz generator 300, according to an example embodiment of the invention. The split-ring THz generator 300 may include a metallic split-ring THz resonator 302, with an optical etalon 304 disposed in a gap of the split-ring THz resonator 302. In an example embodiment, laser light 306 may be focused on the optical etalon 304 and in the gap of the split-ring THz resonator 302.

Figure 4:
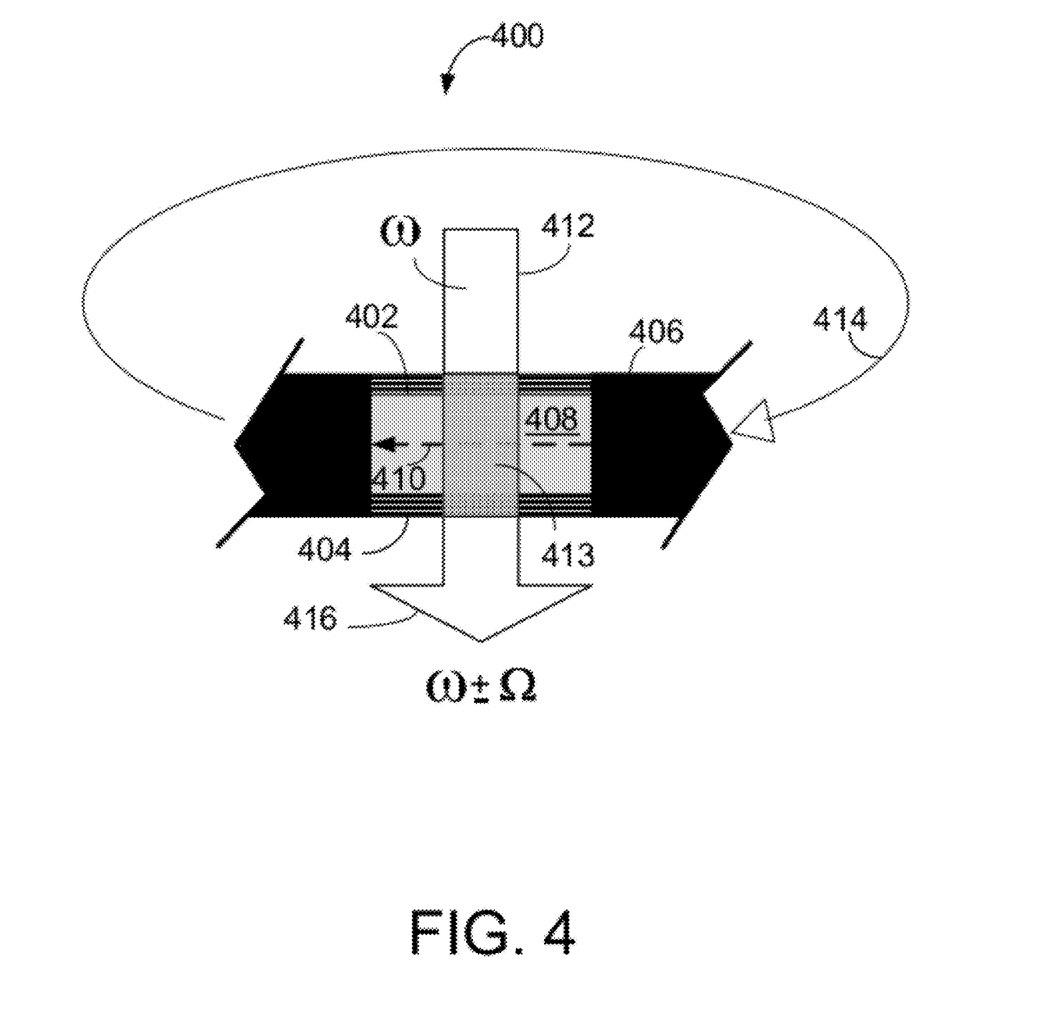
FIG. 4 is a block diagram of an optical etalon in a split-ring terahertz resonator according to an example embodiment of the invention.

FIG. 4 depicts an optical etalon 400 disposed in the gap of a split-ring THz resonator. In an example embodiment, the etalon (or optical cavity resonator) may be defined by a non-linear material 408 sandwiched between an input mirror 402 and an output mirror 404, and placed in the gap of a split-ring THz resonator 406. This arrangement mimics a Fabry-Perot interferometer, but with non-linear material defining the path length between the mirrors 402, 404.

In example embodiments, the mirrors 402, 404 may include dielectric stacks. In other example embodiments, the mirrors may be coated with a partially reflective coating, such as silver, gold, chrome, etc. According to example embodiments, the non-linear material 408 in the optical cavity may include cadmium telluride (CdTe), zinc telluride (ZnTe), or lithium niobate (LiNb03), or other optical material that exhibits a change in refractive index in response to an applied electric field.

In an example embodiment, input laser light 412 may pass through the input mirror 402. A small percentage of the incident light may reflect from the incident surface of the input mirror 402 depending on the presence or absence of anti-reflection coatings on the incident surface of the mirror. The light that passes through the input mirror 402 may traverse through the non-linear material 408 (adding to the cavity light 413) and may then encounter the output mirror 404. Depending on the reflectivity of the output mirror 404, a portion of the cavity light 413 will pass through the output mirror 404, resulting in the output laser light 416. Depending upon the reflectivity of the output mirror 404 reflectivity, a portion of the cavity light 413 may be reflected by the output mirror 404, back into the non-linear material 408, adding to the cavity light 413. The light reflected from the output mirror 404 back into the cavity may traverse the non-linear optical material 408 and encounter the input mirror 402, where it may again experience reflection back into the optical cavity. According to an example embodiment, the optical intensity or power of the cavity light 413 within the cavity may be greater than the input laser light 412 due to the storage of optical power from the multiple reflections between the mirrors 402, 404.

According to an example embodiment of the invention, the optical etalon cavity, as depicted in FIG. 4, may provide a tight mode confinement of the cavity light 413, and may enhance the interaction of the optical electric fields with the split-ring THz resonator 406. According to an example embodiment of the invention, the cavity light 413 may (via the Pockels effect, the Faraday effect, or the Kerr effect) induce a charge potential in the non-linear material 408, which may in turn, induce an electric and/or magnetic field 414 in the split-ring THz resonator 406. In principle, this parametric coupling could be formed by using any material that exhibits a change in the index of refraction in response to an externally applied THz electromagnetic field. Example embodiments of the optical resonant cavity could take a variety of forms, including but not limited to, a Fabry-Perot etalon with high-reflectivity Bragg reflectors (as depicted in FIG. 4), a micro-sphere resonator, a micro-ring resonator, or a photonic crystal cavity. Example embodiments of the THz resonant cavity include, but are not limited to, a metallic split-ring resonator (as depicted in FIG. 3 and FIG. 4) or a THz photonic crystal cavity.

According to an example embodiment of the invention, the Pockels effect, the Faraday effect, or the Kerr effect may be utilized to induce a change in the index of refraction in the non-linear optical material via the THz electric field 410. The change in refractive index may modify the optical path length of the non-linear material, and therefore, the resonance frequency of the optical resonator may change, oscillate, or modulate as a function of the electric field of the THz 410.

In an example embodiment, the input laser light 412 may be detuned towards the high-energy side of a single optical resonance mode within the etalon 400, and the output laser light 416 may be shifted in frequency towards the lower-energy side of the optical resonance mode. In another example embodiment of the invention, the cavity length of the etalon may be increased to reduce the free spectral range (i.e., the frequency between the resonant optical modes of the etalon) to equal the THz resonant frequency so that the input laser light 412 frequency is resonant with one optical mode, and the output laser light 416 frequency (Stokes light) is resonant with another optical mode. This embodiment may allow for higher optical quality factors, and a correspondingly lower laser pump threshold power.

Figure 5:
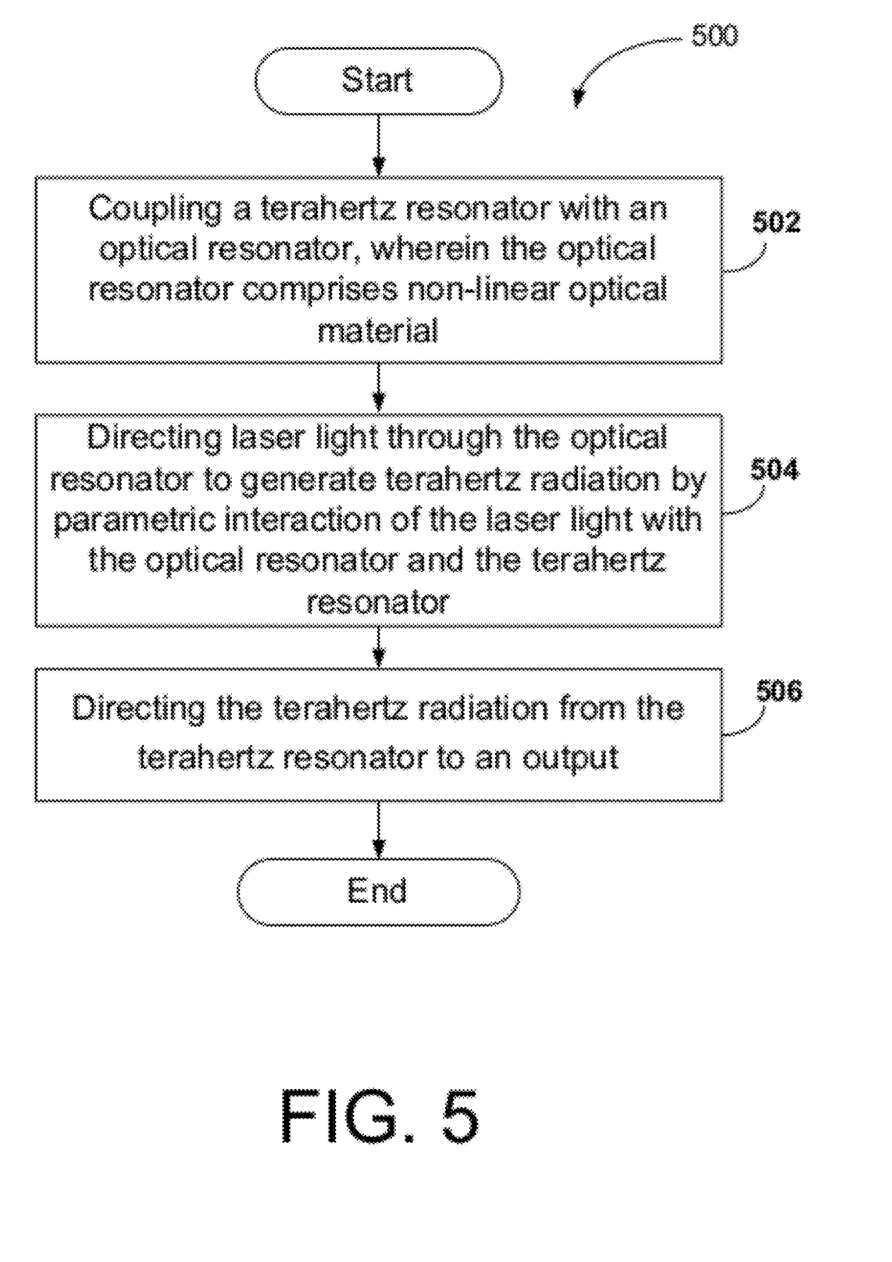
FIG. 5 is a flow diagram of an example method for generating terahertz electromagnetic radiation, according to an example embodiment of the invention.

An example method 500 for generating terahertz electromagnetic radiation will now be described with reference to the flow diagram of FIG. 5. The method 500 starts in block 502, and according to an example embodiment of the invention, includes coupling a terahertz resonator with an optical resonator, wherein the optical resonator comprises non-linear optical material. In block 504, and according to an example embodiment, the method 500 includes directing laser light through the optical resonator to generate terahertz radiation by parametric interaction of the laser light with the optical resonator and the terahertz resonator. In block 506, and according to an example embodiment, the method 500 includes directing the terahertz radiation from the terahertz resonator to an output. The method 500 ends after block 506.

According to additional example embodiments, coupling the THz resonator (406) with the optical resonator (304) includes disposing the non-linear optical material (408) in a gap of a split-ring THz resonator (302). Example embodiments include directing laser light (412) through the optical resonator, which may include an etalon. In an example embodiment, the etalon includes a Fabry-Perot (304) etalon having a cavity defined by the non-linear optical material (408), wherein the cavity is disposed in a gap associated with a split-ring THz resonator (302). According to an example embodiment, coupling the THz resonator (406) with the optical resonator includes disposing the non-linear optical material (304, 408) in a gap associated with a split-ring terahertz resonator (302, 406) for interaction of a THz electric and/or magnetic field (410) with the non-linear optical material (408) associated with the optical resonator when input laser light (412) passes through and polarizes the non-linear optical material (408).

In an example embodiment, directing input laser light (412) through the optical resonator to generate THz radiation (212) includes utilizing optical rectification to induce an electrical or magnetic field within the THz resonator (406). In an example embodiment, directing the THz radiation (212) from the THz resonator to an output comprises extracting power from the THz resonator (206).

Example embodiments of the invention include a system and/or an apparatus for generating THz electromagnetic radiation. The system includes a laser (202) for producing input laser light (204) with a center frequency. The system and/or apparatus includes an optical resonator comprising an input mirror (402) and an output mirror (404), and a non-linear optical material (408). The optical resonator is operable to receive the laser light (204). The system and/or apparatus includes a THz resonator (406) coupled with the optical resonator through the non-linear optical material (408), and the THz resonator (406) generates THz radiation by the parametric interaction of the laser light (204) with the optical resonator and the THz resonator (406). The THz resonator (406) may include a split-ring resonator (302). The optical resonator may include an etalon. The etalon may be a Fabry-Perot etalon having a cavity defined by the non-linear optical material (408), wherein the cavity is disposed in a gap associated with a split-ring THz resonator (302). The optical resonator may be configured for inducing an oscillating electrical or magnetic field within the THz resonator (406) by utilizing optical rectification of the laser light (412) within the non-linear optical material (408) associated with the optical resonator. A waveguide or free space optical system adjacent to the THz resonator (406) may be utilized for coupling the THz radiation (212) to an output.

Accordingly, example embodiments of the invention can provide the technical effects of creating certain systems, methods, and apparatus that can generate THz radiation. Example embodiments of the invention can provide the further technical effects of providing systems, methods, and apparatus for generating THz radiation with compact devices operating at room temperature.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for generating terahertz electromagnetic radiation, the method comprising:
    coupling a terahertz resonator with an optical resonator, wherein the optical resonator comprises non-linear optical material;
    directing laser light through the optical resonator to generate terahertz radiation by parametric interaction of the laser light with the optical resonator and the terahertz resonator; and
    directing the terahertz radiation from the terahertz resonator to an output.

2. The method of claim 1, wherein coupling the terahertz resonator with the optical resonator comprises disposing the non-linear optical material in a gap of a split-ring terahertz resonator.

3. The method of claim 1, wherein directing the laser light through the optical resonator comprises directing laser light through an etalon.

4. The method of claim 3, wherein the etalon comprises a Fabry-Perot etalon having a cavity defined by the non-linear optical material, wherein the cavity is disposed in a gap associated with a split-ring terahertz resonator.

5. The method of claim 1, wherein coupling the terahertz resonator with the optical resonator comprises disposing the non-linear optical material in a gap associated with a split-ring terahertz resonator for interaction of a terahertz magnetic field with the non-linear optical material associated with the optical resonator when laser light passes through and polarizes the non-linear optical material.

6. The method of claim 1, wherein directing laser light through the optical resonator to generate terahertz radiation comprises utilizing optical rectification to induce an electrical or magnetic field within the terahertz resonator.

7. The method of claim 1, wherein directing the terahertz radiation from the terahertz resonator to an output comprises extracting power from the terahertz resonator.

8. A system for generating terahertz electromagnetic radiation, the system comprising:
    a laser for producing laser light with a center frequency $\omega$;
    an optical resonator comprising a non-linear optical material and operable to receive the laser light;
    a terahertz resonator coupled with the optical resonator through the non-linear optical material, wherein the terahertz resonator generates terahertz radiation by parametric interaction of the laser light with the optical resonator and the terahertz resonator.

9. The system of claim 8, wherein the terahertz resonator comprises a split-ring resonator.

10. The system of claim 8, wherein the optical resonator comprises an etalon.

11. The system of claim 10, wherein the etalon comprises a Fabry-Perot etalon having a cavity defined by the non-linear optical material, wherein the cavity is disposed in a gap associated with a split-ring terahertz resonator.

12. The system of claim 8, wherein the optical resonator is configured for inducing an oscillating electrical or magnetic field within the terahertz resonator by utilizing optical rectification of the laser light within the non-linear optical material associated with the optical resonator.

13. The system of claim 8, further comprising a waveguide or free space optical system adjacent to the terahertz resonator for coupling the terahertz radiation to an output.

14. An apparatus for generating terahertz electromagnetic radiation, the apparatus comprising:
    an optical resonator comprising a non-linear optical material and operable to receive laser light;
    a terahertz resonator coupled with the optical resonator through the non-linear optical material, wherein the terahertz resonator is configured for generating terahertz radiation by parametric interaction of the laser light with the optical resonator and the terahertz resonator.

15. The apparatus of claim 14, wherein the terahertz resonator comprises a split-ring resonator.

16. The apparatus of claim 14, wherein the optical resonator comprises an etalon.

17. The apparatus of claim 16, wherein the etalon comprises a Fabry-Perot etalon having a cavity defined by the non-linear optical material, wherein the cavity is disposed in a gap associated with a split-ring terahertz resonator.

18. The apparatus of claim 14, wherein the optical resonator is configured for inducing an oscillating electrical or magnetic field within the terahertz resonator by utilizing optical rectification of laser light within the non-linear optical material associated with the optical resonator.

19. The apparatus of claim 14, further comprising a waveguide or free space optical system adjacent to the terahertz resonator for coupling the terahertz radiation to an output.

20. The apparatus of claim 14, wherein a refractive index associated with the optical non-linear material is controlled by one or more electromagnetic fields.

* * * * *